United States Patent
Shi et al.

(10) Patent No.: US 11,321,233 B2
(45) Date of Patent: May 3, 2022

(54) MULTI-CHIP SYSTEM AND CACHE PROCESSING METHOD

(71) Applicant: Shanghai Zhaoxin Semiconductor Co., Ltd., Shanghai (CN)

(72) Inventors: Yang Shi, Shanghai (CN); Chen Chen, Shanghai (CN); Weilin Wang, Shanghai (CN); Jiin Lai, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 92 days.

(21) Appl. No.: 16/855,996

(22) Filed: Apr. 22, 2020

(65) Prior Publication Data

US 2020/0394138 A1    Dec. 17, 2020

(30) Foreign Application Priority Data

Jun. 12, 2019 (CN) .......................... 201910504889.X

(51) Int. Cl.
*G06F 12/0815* (2016.01)
*G06F 12/0817* (2016.01)
*G06F 12/0831* (2016.01)

(52) U.S. Cl.
CPC ...... *G06F 12/0815* (2013.01); *G06F 12/0817* (2013.01); *G06F 12/0831* (2013.01); *G06F 2212/1032* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 2003/0009621 A1* | 1/2003 | Gruner | ............... | G06F 12/0813 711/118 |
| 2004/0022107 A1* | 2/2004 | Zaidi | ................. | G06F 15/7832 365/202 |
| 2004/0088487 A1* | 5/2004 | Barroso | ............. | G06F 12/0811 711/122 |
| 2004/0268052 A1* | 12/2004 | Glasco | ............... | G06F 12/0817 711/141 |

(Continued)

FOREIGN PATENT DOCUMENTS

CN            109213641            1/2019

*Primary Examiner* — Kaushikkumar M Patel
(74) *Attorney, Agent, or Firm* — JCIPRNET

(57) ABSTRACT

A multi-chip system and a cache processing method are provided. The multi-chip system includes multiple chips. Each chip includes multiple clusters, a crossbar interface, and a snoop system. Each cluster corresponds to a local cache. The crossbar interface is coupled to the clusters and a crossbar interface of another chip. The snoop system is coupled to the crossbar interface and performs unidirectional transmission with the crossbar interface. The snoop system includes a snoop table module and multiple trackers. The snoop table module includes a shared cache, which records a snoop table. Multiple trackers are coupled to the snoop table module, query the snoop table in the shared cache according to a memory access request initiated by one of clusters, and update the snoop table according to a query result. The snoop table corresponds to a storage structure of the local cache corresponding to the clusters in all chips.

34 Claims, 9 Drawing Sheets

(56) References Cited

U.S. PATENT DOCUMENTS

| | | | |
|---|---|---|---|
| 2006/0059315 A1* | 3/2006 | Moll | G06F 12/0817 |
| | | | 711/141 |
| 2006/0176890 A1* | 8/2006 | Clark | G06F 15/16 |
| | | | 370/406 |
| 2014/0052916 A1* | 2/2014 | Lih | G06F 12/0806 |
| | | | 711/119 |
| 2016/0147659 A1* | 5/2016 | Drapala | G06F 12/0817 |
| | | | 711/141 |
| 2018/0189180 A1* | 7/2018 | Fahim | G06F 12/0833 |
| 2018/0225216 A1* | 8/2018 | Filippo | G06F 11/3419 |

* cited by examiner

MULTI-CHIP SYSTEM AND CACHE PROCESSING METHOD

CROSS-REFERENCE TO RELATED APPLICATION

This application claims the priority benefit of China application serial no. 201910504889.X, filed on Jun. 12, 2019. The entirety of the above-mentioned patent application is hereby incorporated by reference herein and made a part of this specification.

BACKGROUND OF THE DISCLOSURE

Field of the Disclosure

The disclosure relates to a cache technique, and more particularly, to a multi-chip system and a cache processing method.

Description of Related Art

One of the current mainstream processor architectures is composed of multiple chips, and each chip may further include multiple clusters. In order to achieve cache coherency, when a cluster issues a memory access request, it is necessary to query the cache of other clusters to see whether there is data. However, if a cluster issues excessive requests, other clusters may be queried frequently, which in turn affects the processing performance of these clusters. Accordingly, in order to improve the operational performance of these clusters, it is necessary to propose an improvement solution for the existing cache coherency.

SUMMARY OF THE DISCLOSURE

In view of the above, the disclosure relates to a multi-chip system and a cache processing method for avoiding excessive snooping which affects the operational performance of each chip.

According to an embodiment of the disclosure, a multi-chip system includes multiple chips. Each cluster may include multiple cores and shares a cache, and multiple clusters are simultaneously connected to a crossbar interface. Each chip includes multiple clusters, a crossbar interface, and a snoop system. Each cluster corresponds to a local cache. The crossbar interface is coupled to the clusters and is coupled to a crossbar interface of another chip. The snoop system is coupled to the crossbar interface and performs unidirectional transmission with the crossbar interface. The snoop system includes a snoop table module and multiple trackers. The snoop table module includes a shared cache, and the shared cache records a snoop table. Multiple trackers are coupled to the snoop table module, query the snoop table in the shared cache according to a memory access request initiated by one of multiple clusters, and update the snoop table according to a query result.

According to an embodiment of the disclosure, a cache processing method includes the following steps. Multiple chips are provided, wherein each of the chips includes multiple clusters, and each of the clusters corresponds to a local cache. A shared cache is provided to each of the chips, wherein the shared cache records a snoop table. The snoop table in the shared cache is queried according to a memory access request initiated by one of the clusters. The snoop table is updated according to a query result without querying the local cache corresponding to the clusters.

In summary of the above, the embodiments of the disclosure provide a snoop table for the multi-chip system, and the snoop table is consistent with the storage structure and the cached content of the local cache corresponding to each cluster. In response to the initiation of the memory access request, the cached content of the snoop table may be snooped to update the snoop table accordingly, so that it is not necessary to disturb the local cache of the cluster, which thereby improves the operational performance of the system.

BRIEF DESCRIPTION OF THE DRAWINGS

The accompanying drawings are included to allow further understanding of the disclosure, and the drawings are incorporated into the specification and form a part of the specification. The drawings illustrate the embodiments of the disclosure, and the drawings and the description together are used to interpret the principles of the disclosure.

DESCRIPTION OF THE EMBODIMENTS

Figure 1:
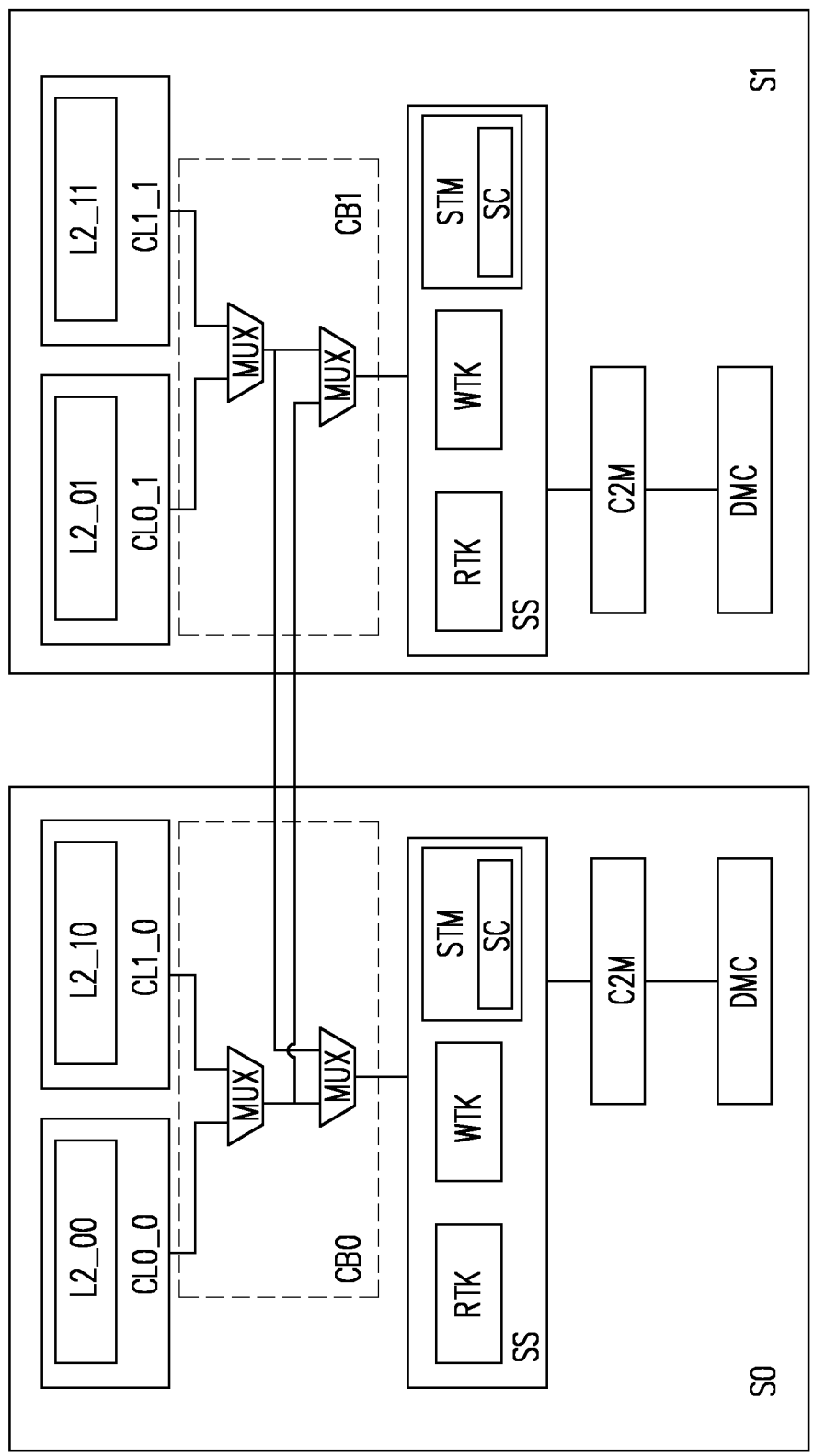
FIG. 1 is a schematic view of a multi-chip system according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

FIG. 1 is a schematic view of a multi-chip system 1 according to an embodiment of the disclosure. Referring to FIG. 1, the multi-chip system 1 includes at least two chips S0 and S1. It is noted that the two chips S0 and S1 are described in the embodiment of the disclosure as an example. However, in other embodiments, the number of the chips may be changed to, for example, three, four, and more according to the requirements.

The chip S0 at least includes two clusters CL0_0 and CL1_0, a crossbar interface CB0, a snoop system SS, a memory access module C2M, and a memory controller DMC, but the disclosure is not limited thereto. The structure of the chip S1 is the same as the structure of the chip S0.

Each of the clusters CL0_0 and CL1_0 may include one or more cores (not shown) and a local cache L2_00 or L2_10 (e.g., a level 2 (L2) cache, which may be implemented by a static random access memory (SRAM)). In other words, the cluster CL0_0 corresponds to the local cache L2_00, and the cluster CL1_0 corresponds to the local cache L2_10. It is noted that one single chip S0 or S1 is described to include two clusters in the embodiment of the disclosure as an example. However, in other embodiments, the number of the clusters may be changed according to the requirements.

The crossbar interface CB0 is coupled to the clusters CL0_0 and CL1_0. In addition, the crossbar interface CB0 of the present embodiment includes two multiplexers MUX and is coupled to the crossbar interface CB1 of the chip S1. It is noted that the crossbar interface CB0 may also be implemented by another interconnection structure and may be input with requests initiated by all the clusters CL0_0, CL1_0, CL0_1, and CL1_1.

The snoop system SS is coupled to the crossbar interface CB0 and is in unidirectional transmission with the crossbar interface CB0. Namely, data and requests are transmitted by the crossbar interface CB0 toward the snoop system SS. The snoop system SS at least includes one or more read trackers RTK, one or more write trackers WTK, and a snoop table module STM, but the disclosure is not limited thereto. The snoop table module STM may include multiple sub-snoop table modules (not shown). For clarity, only one read tracker RTK and one write tracker WTK are shown in the drawing.

Each read tracker RTK is configured to process a memory access request initiated by any one of the clusters CL0_0 and CL1_0 and its operation content will be described in detail in subsequent embodiments. In the present embodiment, the memory access request processed by the read tracker RTK is a memory read request for a system memory (which may be implemented by a dynamic random access memory (DRAM)). The memory read request is to read the data at a specified physical address in the system memory.

Each write tracker WTK is configured to process a memory access request initiated by any one of the clusters CL0_0 and CL1_0, and the content of its operation will be described in detail in subsequent embodiments. In the present embodiment, the memory access request processed by the write tracker WTK is a memory write request or an eviction request for the system memory. The memory write request is to write data to a specified physical address. The eviction request is to clear/remove the data. It is noted that the trackers of the present embodiment of the disclosure include the read tracker RTK and the write tracker WTK and process different types of memory access requests respectively through the read tracker RTK and the write tracker WTK. However, in other embodiments, various memory access requests may also be processed through one single type of tracker. In other words, the same one tracker may have the functions of reading and writing.

The snoop table module STM is coupled to the trackers (e.g., the read tracker RTK and the write tracker WTK), and the snoop table module STM includes a shared cache SC and a control circuit (not shown, configured to perform logical operations of the snoop table module STM). The shared cache SC may be, for example, a level 3 (L3) cache, a last level cache (LLC), etc., and may be implemented by a static random access memory (SRAM). The shared cache SC records a snoop table. In the present embodiment of the disclosure, the snoop table corresponds to the storage structure of the local caches L2_00, L2_10, L2_01, and L2_11 corresponding to all the clusters CL0_0, CL1_0, CL0_1, and CL1_1 in all the chips S0 and S1.

Figure 2:
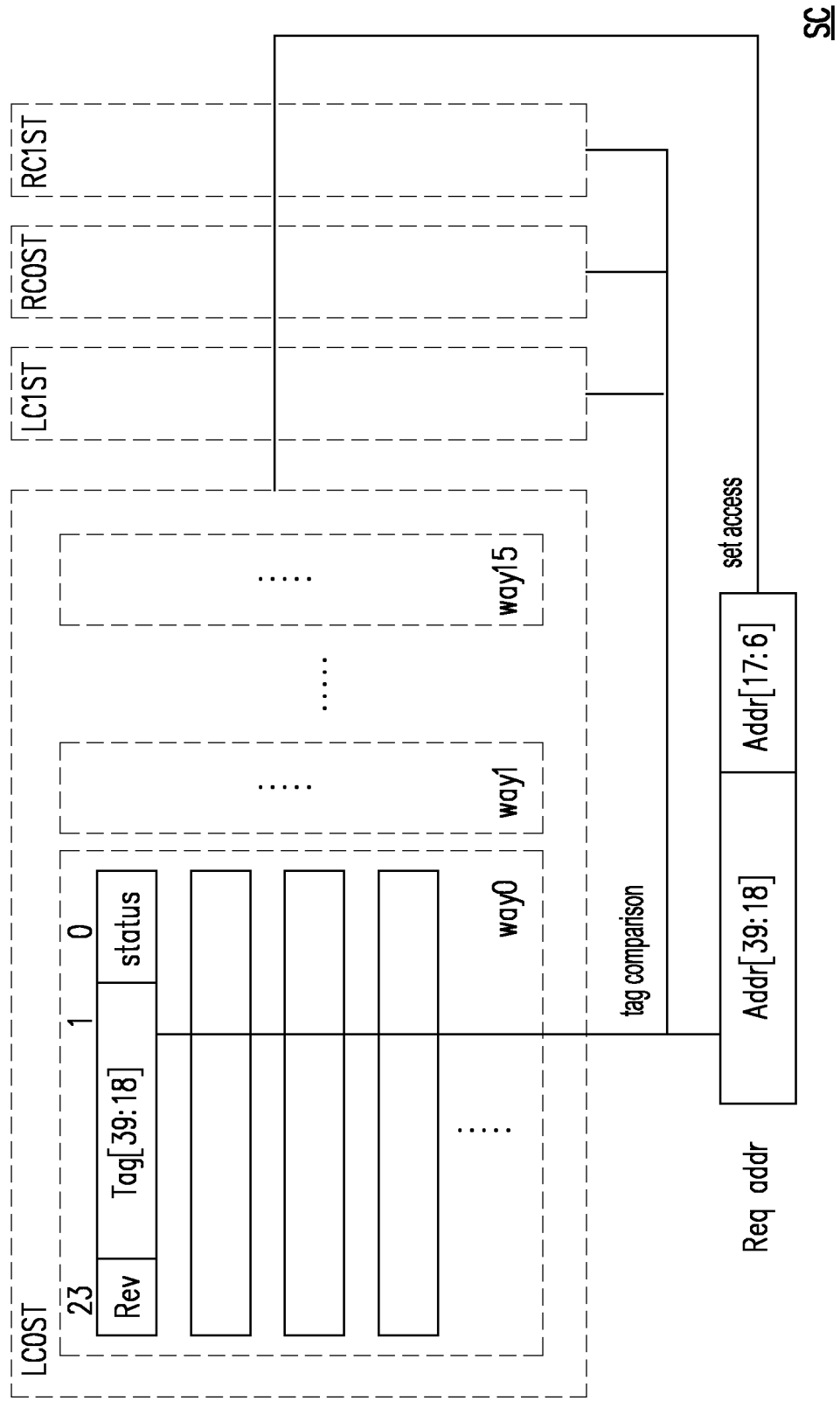
FIG. 2 is a schematic view of a snoop table according to an embodiment of the disclosure.

For example, each of the local caches L2_00, L2_10, L2_01, and L2_11 includes several cache blocks (or referred to as cache lines and respectively corresponding to an entry/set). It is assumed that each of the local caches L2_00, L2_10, L2_01, and L2_11 includes 16 ways, each way includes 256 entries (a total of 4096 entries), and each entry at least includes 22 bits for recording a physical address tag of the system memory and 1 bit for recording a valid status/value. FIG. 2 is a schematic view of a snoop table according to an embodiment of the disclosure. A snoop table recorded by the shared cache SC includes cache blocks of all the local caches L2_00, L2_10, L2_01, and L2_11. A first snoop table LC0ST includes 16 ways way0 to way15, and each way includes 256 entries/sets, which is consistent with the storage structure of the local cache L2_00. In other words, the numbers of rows and columns of the snoop table correspond to the numbers of rows and columns of the local cache. In the first snoop table LC0ST, each entry includes 24 bits of data, wherein 1 bit is reserved (in which the field name is the reserved REV), 22 bits are used to record the physical address tag Tag of the system memory (consistent with the physical address tag recorded in the same cache block in the same way of the corresponding local cache L2_00), and 1 bit is used to record a valid status Status of the corresponding local cache L2_00 (consistent with the valid status recorded in the same cache block in the same way of the corresponding local cache L2__00). Reference may be made to the description of the first snoop table LC0ST for descriptions of second to fourth snoop tables LC1ST, RC0ST, and RC1ST, which respectively correspond to the local caches L2_10, L2_01, and L2_11. It can be learned that the chip S0 records four snoop tables, which respectively record the cache contents of the local caches L2_00 and L2_10 of the local clusters CL0_0 and CL1_0, and the cache contents of the local caches L2_01 and L2_11 of the remote clusters CL0_1 and CL1_1. In addition, the storage structure of each snoop table is consistent with the corresponding local cache, so that the snoop table module STM does not need to return to snoop/query the local caches L2_00, L2_10, L2_01, and L2_11 of the corresponding clusters CL0_0, CL1_0, CL0_1, and CL1_1, but can directly snoop the local snoop table to accomplish the function of unidirectional transmission (its operation will be described in detail in subsequent embodiments).

When the snoop table module STM obtains a memory access request from any one of the clusters CL0_0, CL1_0, CL0_1, and CL1_1, one of the sets may be learned from the $6^{th}$ to $17^{th}$ bits in an address Req addr recorded in the memory access request, and the physical address tag may be learned from the $18^{th}$ to $39^{th}$ bits. Namely, the four snoop tables may be queried accordingly (e.g., comparing the content recorded in the specified set of each way in the four snoop tables to determine whether a matching physical address tag is present).

The result of the query may come in the following scenarios. The first scenario is: if the valid status corresponding to the matching physical address tag of a way is associated with "valid", it means that a valid storage block/line is present in the same way of the corresponding local cache L2_00, L2_10, L2_01, or L2_11.

The second scenario is: if the physical address tag in the same way of the corresponding local cache L2_00, L2_10, L2_01, or L2_11 of the cluster CL0_0, CL1_0, CL0_1, or CL1_1, which initiates the memory access request does not match the memory access request, but the corresponding valid status is associated with "valid", then the existing/old valid storage block/line in the corresponding local cache cache L2_00, L2_10, L2_01, or L2_11 is replaced by the new request, and eviction or another invalidation operation is performed on the data of the storage block/line. The invalidation operation means that another one among CL0_0, CL1_0, CL0_1, and CL1_1 (i.e., the cluster which does not initiate the memory access request) invalidates the existing/old valid storage block/line through a non-share-OK snoop request. The corresponding local cache L2_00, L2_10, L2_01, or L2_11 performs an invalidation (INVD) command or another operation that invalidates the existing/old valid storage block/line.

It is noted that the structure of the snoop table in the present embodiment changes according to the structures of different local caches, and the content recorded in each entry is not limited to the physical address tag and the valid status.

The memory access module C2M (which may be implemented by a control circuit) is coupled to the snoop system SS. The memory access module C2M accesses the system memory according to the memory access request and integrates the content obtained or written by the memory access request with the modified data indicated by a snoop response.

The memory controller DMC is coupled to the memory access module C2M and the system memory (not shown). The memory controller DMC is configured to access the system memory according to the memory access request.

On the other hand, the chip S1 at least includes two clusters CL0_1 and CL1_1, a crossbar interface CB1, a snoop system SS, a memory access module C2M, and a memory controller DMC, but the disclosure is not limited thereto. Each of the clusters CL0_1 and CL1_1 may include one or more cores (not shown) and a local cache L2_01 or L2_11 (e.g., an L2 cache, which may be implemented by an SRAM). In other words, the cluster CL0_1 corresponds to the local cache L2_01 and the cluster CL1_1 corresponds to the local cache L2_11.

It is noted that the crossbar interface CB1, the snoop system SS, the memory access module C2M, and the memory controller DMC of the chip S1 may respectively correspond to the crossbar interface CB0, the snoop system SS, the memory access module C2M, and the memory controller DMC of the chip S0, so their contents shall not be repeatedly described herein. It can be learned that the chip S1 also includes snoop tables that may correspond to the storage structures/storage contents of all the local caches L2_00, L2_10, L2_01, and L2_11.

To facilitate the understanding of the operation process of the present embodiment of the disclosure, several embodiments will be provided below to detail the operation process of the multi-chip system 1 in the present embodiment of the disclosure. Hereinafter, the method of the present embodiment of the disclosure will be described with reference to the components of the multi-chip system 1. The processes of the method may be adjusted according to the implementation conditions and are not limited thereto.

Figure 3:
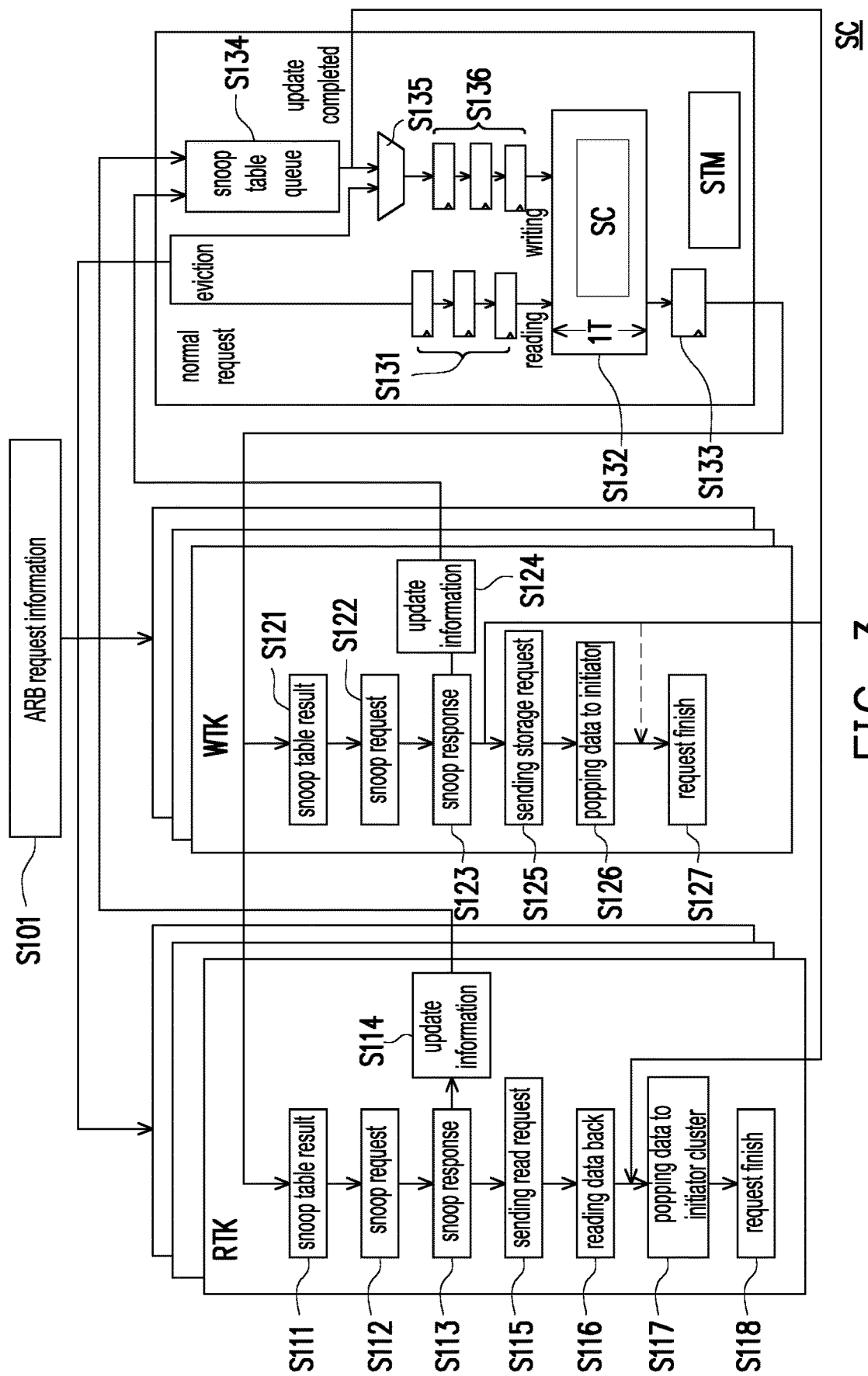
FIG. 3 is a flowchart of processing of a memory access request according to an embodiment of the disclosure.

FIG. 3 is a flowchart of processing of a memory access request according to an embodiment of the disclosure. Referring to FIG. 3, before the snoop system SS snoops a specific memory access address for a specific request, the snoop table may be first queried to obtain information about snooping the target among the local caches L2_00, L2_10, L2_01, andr L2_11. In addition, the snoop table has to be updated in response to issuing the memory access request, so that the content recorded in the snoop table can be consistent with the content cached in the local caches L2_00, L2_10, L2_01, or L2_11.

It is noted that the read tracker RTK or the write tracker WTK may issue a snoop request to the snoop table STM to snoop the content recorded in the corresponding cache line/block corresponding to the specific cluster CL0_0, CL1_0, CL0_1, or CL1_1 in the snoop table. It is noted that two attributes, i.e., a snoop cache request and a share request, may be carried in the snoop request. The first one is cacheable. If the snoop request records "cacheable", then when the memory access request is initiated by the cluster CL0_0, CL1_0, CL0_1, or CL1_1, the carried content may be cached in the corresponding local cache L2_00, L2_10, L2_01, or L2_11 and in the corresponding snoop table. For example, the data with a write-back (WB) type obtained by the read request occupies an entry in the local cache L2_00, and the corresponding set and the route in the snoop table corresponding to the local cache L2_00 (i.e., corresponding to the cluster that initiates the request) also need to be valid. As another example, all data corresponding to the write request will be invalidated in the local cache L2_10 corresponding to the initiator (assumed to be the cluster CL1_0), and the same way and set in the snoop table corresponding to the local cache L2_10 also need to be invalidated. The second one is a shareable request, or referred to as a share-OK request. When a request (e.g., a read invalid request) exclusively occupies a cache block/line in the local cache L2_01 corresponding to the initiator (assumed to be the cluster CL0_1), or when a request (e.g., a write request) is expected to invalidate all the local caches L2_00, L2_10, L2_01, and L2_11, the tracker may send information with "non-share-OK" to request to invalidate the other local caches L2_00, L2_10, L2_01, and L2_11. For a snoop table, a read request containing a shareable request, for example, does not invalidate the records in the corresponding storage block/line in the clusters among the clusters CL0_0, CL1_0, CL0_1, and CL1_1 that do not initiate the request. In brief, the difference between the snoop requests respectively having these two attributes lies in that the cacheable attribute is specific to the cluster that initiates the request, and the shareable request is specific to all the clusters other than the cluster that initiates the request.

Next, the overall process will be described in detail. The snoop system SS extracts a carried request or other request information for a memory access request initiated by any one of the clusters CL0_0, CL1_0, CL0_1, and CL1_1 (step S101). First, with respect to normal requests (e.g., memory read requests) initiated by the clusters, the snoop table module STM sequentially processes multiple requests (step S131), queries the snoop table in the shared cache SC accordingly (step S132) (e.g., obtaining the corresponding content recorded in the corresponding snoop table according to the memory read request), and determines to snoop one of the clusters CL0_0, CL1_0, CL0_1, and CL1_1 and whether snooping is required according to the query result (step S133). One normal request is handled by one read tracker RTK. It is assumed that a set of read trackers RTK may process 48 requests. Namely, 48 read trackers RTK respectively process these requests. However, in other embodiments, the number of the read trackers RTK may be different. One read tracker RTK obtains the query result (i.e., the result obtained in step S133) from the snoop table module STM and may take five time units to obtain the result (step S111), to determine to snoop one of the clusters CL0_0, CL1_0, CL0_1, and CL1_1 and issue a snoop request to the snoop table module STM accordingly (step S112) to snoop the content recorded in the corresponding cache line corresponding to the specified cluster CL0_0, CL1_0, CL0_1, or CL1_1, in the snoop table. After obtaining a snoop response from the snoop table module STM in response to the snoop request, the read tracker RTK issues update information to the snoop table module STM to update the snoop table (step S114). It is noted that the update information is generated based on the type of the request, for example, according to the attribute (cacheable and share-OK) of the request.

The snoop table module STM sequentially caches the update information (i.e., the update information issued to the snoop table module STM) according to the time sequence in which the clusters initiate the memory access requests through a snoop table queue STQ (step S134), and the snoop table module STM sequentially processes the update information according to the cache sequence (step S136). The snoop table module STM writes the update information to the snoop table at a specific time (step S132). It is noted that, in other embodiments, the update information is not popped to the snoop table queue STQ after the snoop response is obtained, and the dependency is not necessarily present between the update information and the snoop response.

Next, the read tracker RTK issues a read request to the system memory through the memory access module C2M and the memory controller DMC (step S115), and reads back the data at a specified physical address from the system memory accordingly (step S116). In addition, in response to completion of the update of the snoop table, the read tracker RTK pops the data (i.e., the data obtained in stepb S116) requested by the memory read request to the corresponding cluster (i.e., the cluster that initiates the request) (step S115) to finish the processing of the request accordingly (step S118). It can be learned that, for the update of the memory read request, before the data is popped to the cluster that initiates the request, the corresponding update request needs to be written to the corresponding cache block/line of the snoop table. Otherwise, eviction of the cache block/line may occur before the update of the snoop table and cause an erroneous order or another error.

With respect to the initiation of eviction-related requests (including the memory write request and the eviction request), the snoop table module STM performs multi-task processing on the update information and the eviction-related request (step S135), sequentially processes the update information and the eviction-related request (step S136), then writes the requested content to the snoop table in the shared cache SC accordingly (step S132) (e.g., writing to the corresponding entry recorded in the corresponding local cache L2_00, L2_10, L2_01, or L2_11 in the snoop table according to the memory write request or the eviction request to update the record), and determines to snoop one of the clusters CL0_0, CL1_0, CL0_1, and CL1_1 and whether snooping is required according to the query result (step S133). One eviction-related request is handled by one write tracker WTK. It is assumed that a set of write trackers WTK may process 36 requests (i.e., 36 write trackers WTK respectively process the requests, but in other embodiments, the number of the write trackers WTK may be different). One write tracker WTK obtains the query result (i.e., the result obtained in step S133) from the snoop table module STM (step S121) to determine to snoop one of the clusters CL0_0, CL1_0, CL0_1, and CL1_1 and issue a snoop request to the snoop table module STM accordingly (step S122) to snoop the content recorded in the corresponding cache line corresponding to the specified cluster CL0_0, CL0_0, CL1_1, or CL1_1 in the snoop table. After obtaining a snoop response from the snoop table module STM in response to the snoop request, the write tracker WTK issues update information to the snoop table module STM to update the snoop table (step S124).

It is noted that, in step S135, the update information cached in the snoop table queue STQ is written to the snoop table in the case where a normal memory write request or eviction request does not occur. In other words, with respect to the priority of writing to the snoop table, the priority of the update information is lower than that of the memory write request or the eviction request. The memory write request or the eviction request updates/writes to the snoop table right after being parsed by the snoop table module STM, while the update information updates the snoop table only after querying the snoop table. Therefore, the processing of the update information is performed according to the sequence cached through the snoop table queue STQ, and the processing of the eviction-related request may bypass this sequence and may be prioritized.

Then, in response to completion of the update of the snoop table, the write tracker WTK issues a write request to the system memory through the memory access module C2M and the memory controller DMC (step S125), and pops the data to the specified physical address in the system memory accordingly (step S126) to finish the processing of the request (step S127). In the present embodiment, with respect to the update of the memory write request, the write request is sent to the system memory only after the corresponding update request is written to the corresponding cache block/line of the snoop table. It is noted that, in other embodiments, it is only necessary that the update of the snoop table is completed before the end of step S127, or it is not necessary to consider whether step S127 is ended.

Next, the update process will be described in detail. As mentioned earlier, except the eviction-related requests, the update information has to be processed sequentially according to the time sequence in which the requests are initiated. With respect to the eviction request, it is only necessary to invalidate the way in the corresponding set of the cluster that initiates the request, and the way corresponds to the column in the snoop module. Moreover, the snoop tables corresponding to the other clusters are not interfered with. With respect to the memory write request, the valid sets corresponding to all the clusters are invalidated. It is more complicated in the case of the memory read request. If the request is accompanied with "cacheable", the record of the cluster that initiates the request needs to be valid. If it is exclusive access, the records of the other clusters need to be valid.

Figure 4:
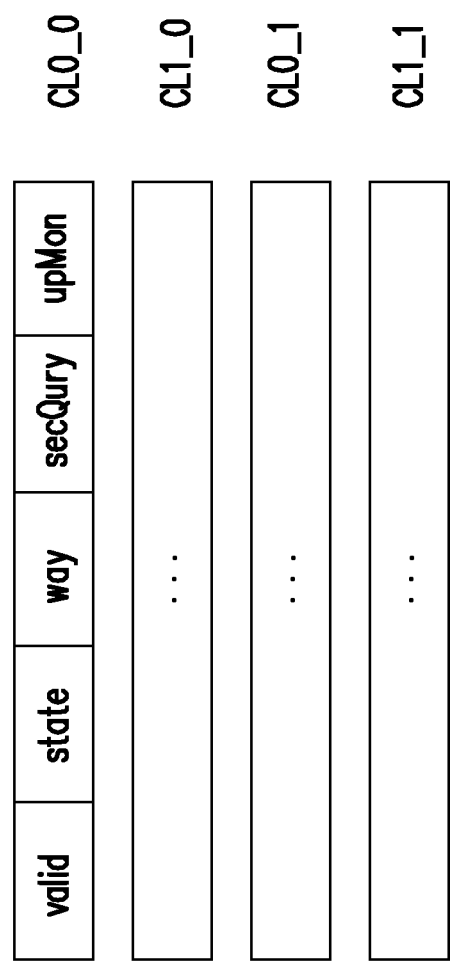
FIG. 4 is a schematic view of update information according to an embodiment of the disclosure.

FIG. 4 is a schematic view of update information according to an embodiment of the disclosure. Referring to FIG. 4, with respect to the memory read or write request, the format of the update information of the different clusters CL0_0, CL1_0, CL0_1, and CL1_1 may be the same. The update information at least includes a valid value (valid), a state value (state), a way (way), a second query (SecQury), and an update monitor (upMon), but the disclosure is not limited thereto.

With respect to the valid value in the update information, when the corresponding cluster CL0_0, CL1_0, CL0_1, or CL1_1 needs to be updated, the valid value is declared (e.g., setting to "1"; setting to "0" if not to be declared). In other words, the valid value is associated with whether to update the snoop table. For example, with respect to the memory write request, if the query result of the snoop table is that it has a value, the valid information is declared (i.e., the valid value is associated with updating the snoop table). With respect to the memory read request, referring to the following truth table (1):

TABLE (1)

| No. | Initiator Cluster | Cacheable | Share-OK | Whether snoop table has value | Valid value |
| --- | --- | --- | --- | --- | --- |
| 1 | 0 | x | x | 0 | 0 |
| 2 | 0 | x | 0 | 1 | 1 |
| 3 | 0 | x | 1 | 1 | 0 |
| 4 | 1 | 1 | x | 1 | 0 |
| 5 | 1 | 1 | x | 0 | 1 |

TABLE (1)-continued

| No. | Initiator Cluster | Cacheable | Share-OK | Whether snoop table has value | Valid value |
|---|---|---|---|---|---|
| 6 | 1 | 0 | x | 0 | 0 |
| 7 | 1 | 0 | x | 1 | 1 |

Specifically, "initiator cluster" being "0" means that it is not the cluster that initiates the request, and "1" means that it is the cluster that initiates the request. "Cacheable" being "0" means non-cacheable, "1" means cacheable, and "x" means not considered. "Share-OK" being "0" means non-share-OK, "1" means share-OK, and "x" means not considered. "Whether snoop table has value" being "0" means no value, and "1" means there is a value. "Valid value" being "0" means not to be declared, and "1" means "declared". In other words, if the one cluster CL0_0, CL1_0, CL0_1, or CL1_1 among the clusters to be updated in the snoop table corresponds to the cluster that initiates the memory read request, and the memory access request records "cacheable" and has no value in the corresponding entry in the snoop table, then the valid value indicates to update the snoop table. If the one cluster CL0_0, CL1_0, CL0_1, or CL1_1 among the clusters to be updated in the snoop table corresponds to the cluster that initiate the memory read request, and the memory access request records "non-cacheable" and has a value in the corresponding entry in the snoop table, then the valid value is associated with updating the snoop table. If the one cluster CL0_0, CL1_0, CL0_1, or CL1_1 among the clusters to be updated in the snoop table does not correspond to the cluster that initiates the memory read request, and the corresponding entry in the snoop table has a value, then the valid value indicates to update the snoop table. Under the other conditions, the valid value indicates not to update the snoop table.

The state value in the update information is the valid status Status in the snoop table as shown in FIG. 2. In other words, the state value is associated with whether the corresponding entry in the snoop table is valid. Only if the corresponding entry is a valid value, the snoop table module STM updates the state value to the snoop table. With respect to the memory access request being the memory read request, if the one cluster CL0_0, CL1_0, CL0_1, or CL1_1 among the clusters to be updated in the snoop table corresponds to the cluster that initiates the memory read request, and the memory read request records "cacheable", then the state value is associated with the corresponding entry in the snoop table being valid. With respect to the memory access request being the memory write request, the state value is associated with the corresponding entry in the snoop table being invalid.

With respect to the way in the update information, with respect to the cluster that initiates the request and the request with "cacheable", the way information is from the request. In other cases, the way information is from the query result of the snoop table.

The second query in the update information is associated with whether to perform a second query on the snoop table. In some cases, the record in the snoop table may be invalidated. Before the snoop table is updated according to a request, it is likely that other requests have occupied the storage line/block or updated the record. Therefore, before the update for this request, it is required to query the snoop table for the second time to confirm whether occupation by other requests as mentioned above has occurred. Referring to the following truth table (2):

TABLE 2

| No. | Read/ write | Initiator cluster | Cacheable | Share-OK | Whether snoop table has value | Second query |
|---|---|---|---|---|---|---|
| 1 | 1 | 1 | 0 | x | 1 | 1 |
| 2 | 1 | 0 | x | 1 | 1 | 0 |
| 3 | 1 | 0 | x | 0 | 1 | 1 |
| 4 | 0 | x | 0 | 0 | 1 | 1 |
| 5 | x | x | x | x | 0 | 0 |

Specifically, "read/write" being "0" means writing, and "1" means reading. "Initiator cluster" being "0" means that it is not the cluster that initiates the request, and "1" means that it is the cluster that initiates the request. "Cacheable" being "0" means non-cacheable, and "1" means cacheable. "Share-OK" being "0" means non-share-OK, and "1" means share-OK. "Whether snoop table has value" being "0" means no value, and "1" means there is a value. "Second query" being "0" means not to be declared, "1" means declared, and "x" means not considered. In other words, with respect to the memory access request being the memory read request, if the one cluster CL0_0, CL1_0, CL0_1, or CL1_1 among the clusters to be updated in the snoop table corresponds to the cluster that initiates the memory read request, and the corresponding entry in the snoop table has a value, then the second query is associated with performing the second query on the snoop table. With respect to the memory access request being the memory read request, if the one cluster CL0_0, CL1_0, CL0_1, or CL1_1 among the clusters to be updated in the snoop table does not correspond to the cluster that initiates the memory read request, and the memory access request records "share-OK" and has a value in the corresponding entry in the snoop table, then the second query is associated with performing the second query on the snoop table. With respect to the memory access request being the memory write request, if the corresponding entry in the snoop table has a value, then the second query is associated with performing the second query on the snoop table. Under the other conditions, the second query is associated with not performing the second query on the snoop table.

The update monitor in the update information is used when the request hits the monitor cycle so as to clear the monitor flag when updating the snoop table.

On the other hand, with respect to the memory write request, it is only necessary that the write tracker WTK sends the corresponding update information to the snoop table queue STQ after the query of the snoop table is completed. With respect to the memory read request, if "cacheable" is recorded, it is necessary to first validate the record of the cluster that initiates the request. However, it is likely that an eviction operation which should invalidate the same set/way before the update may occur after the update and cause multiple pieces of update information to be abnormally ordered/out of order. The following will describe two scenarios in which the memory read request with "cacheable" needs to wait for certain conditions (e.g., an expected eviction request, or confirmation that eviction will not occur/be cancelled) before popping the update information to the snoop table queue STQ, and meanwhile, the update information is named first update information, second update information, third update information, etc. according to the sequence of the update information. In both scenarios, the content of the target memory read request will replace the data of the storage line/block in the cache, and eviction is likely to occur.

The first scenario is set/way matching (herein abbreviated as MatSetWay). When the target request is to query the snoop table, other requests which were issued earlier than this target request (i.e., were ordered first) may still be on the fly (not yet processed in a certain time window, and popping data to the corresponding cluster CL0_0, CL1_0, CL0_1, or CL1_1 at the end of this time window). These other requests satisfy the MatSetWay scenario if satisfying the following conditions: assuming that at least one piece of first update information belongs to these other requests, and the second update information belongs to the target request, the snoop table module STM determines that the first and second update information both records "cacheable", the second update information corresponds to the same cluster as the first update information, and the second update information corresponds to the same entry/set and way as the first update information. In other words, one cluster continuously issues multiple memory read requests of the same set and way. In response to completion of the first update information for the snoop table, the snoop table module STM then processes the second update information. MatSetWay is used to detect the corresponding storage line/block belonging to a request that has not updated the snoop table. When the detected request pops data, it can be confirmed that the update information corresponding to the request has been updated to the snoop table.

Figure 5:
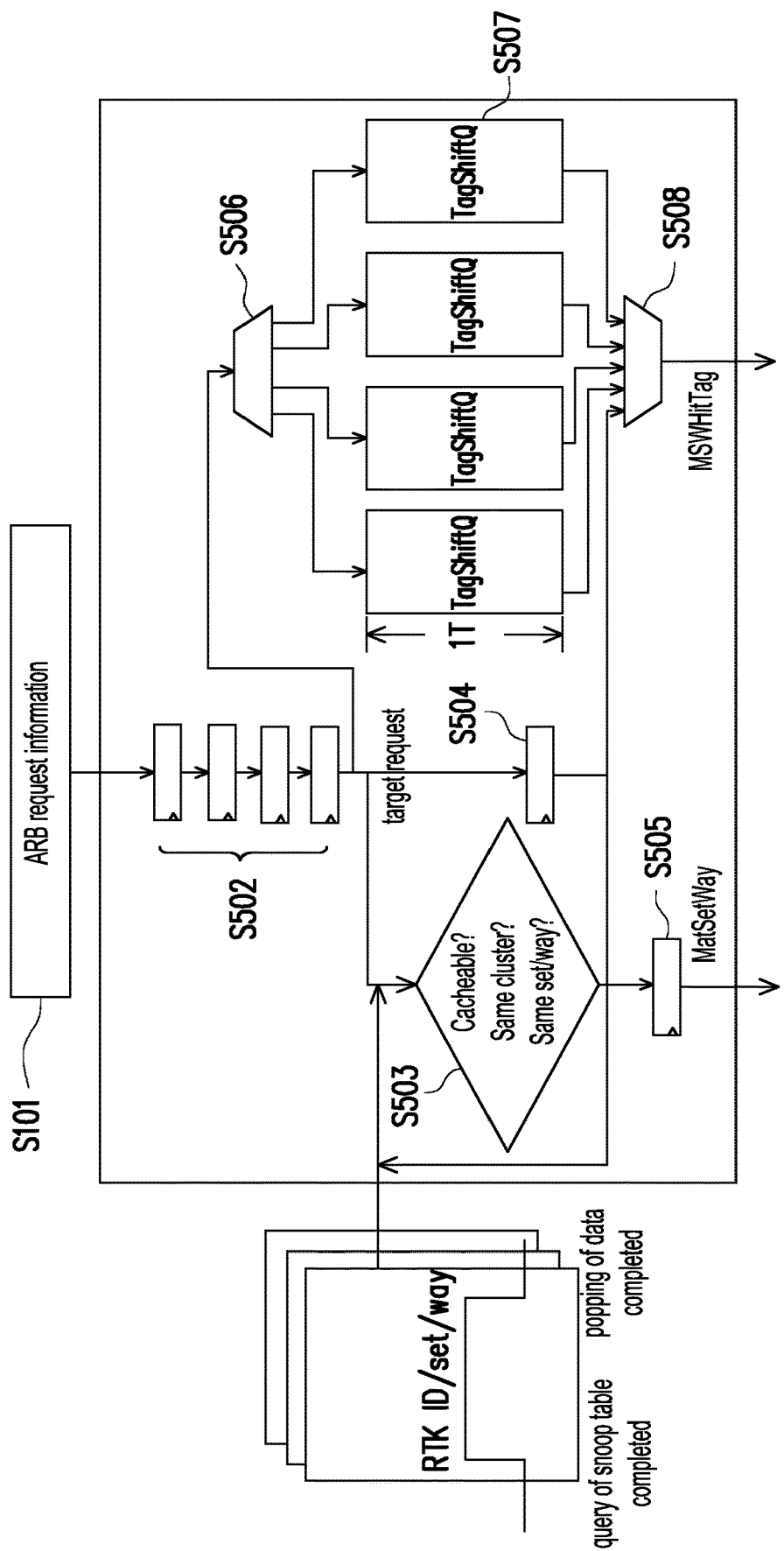
FIG. 5 is a flowchart of processing of a memory read request according to an embodiment of the disclosure.

FIG. 5 is a flowchart of processing of a memory read request according to an embodiment of the disclosure. Referring to FIG. 5, the snoop table module STM extracts a carried attribute from a memory access request (step S501), and processes multiple requests accordingly (step S502). When the snoop table module STM processes the target request (step S504), the snoop table module STM further determines whether the update information corresponding to the target request is cacheable, whether it belongs to the same cluster CL0_0, CL0_0, CL1_0, CL0_1, or CL1_1 as the previous piece of update information with "cacheable", and whether it is of the same set and way as the previous piece of update information with "cacheable" (step S503). If all are satisfied, the snoop table module STM determines that it satisfies MatSetWay (step S505), and records an identifier ID (this identifier is associated with the order in which the corresponding request is initiated) of this previous piece of update information. On the other hand, the snoop table module STM processes the multiple pieces of update information with "cacheable" by multitasking, and uses a tag shift queue (which may be abbreviated as TagShiftQ) corresponding to the cluster CL0_0, CL1_0, CL0_1, or CL1_1 (step S507) to obtain the memory physical address (this selected tag may be abbreviated as MSWHitTag) recorded in the corresponding entry of the earliest piece of update information (cacheable and of the same set/way) (step S508). This MSWHitTag may be used to determine whether the corresponding request has been updated. It is noted that the depth of each TagShiftQ is consistent with that of the read tracker RTK (e.g., 48, 36, 72, etc.).

On the other hand, the second scenario is that the snoop table is busy (herein abbreviated as STBusy). Other requests satisfy STBusy if satisfying the following conditions: assuming that at least one piece of third update information belongs to these other requests and the fourth update information belongs to the target request, the snoop table module STM determines that the third and fourth update information both records "cacheable", the fourth update information corresponds to the same cluster as the third update information, and the fourth update information and the third update information correspond to different memory physical addresses (i.e., different tags). In the second scenario, the snoop table module STM only needs to consider the snoop query result from the cluster that initiates the request. If the query result is that the way corresponding to the request is to become a valid state, and the corresponding tag in the snoop table is inconsistent with the tag of the request, then it may be determined as the STBusy scenario. In other words, when the STBusy scenario occurs, the corresponding tag may be found in the query process, and this tag (which may be abbreviated as BusyTag) is a valid tag and is different from the tag recorded in the request. Similarly, both the BusyTag and MSWHitTag are used to determine whether the previous update has been completed, and only after confirming that the update has been completed, the snoop table module STM updates the update information of the target request to the snoop table. In other words, in response to completion of the third update information for the snoop table, the snoop table module STM then processes the fourth update information.

In an embodiment, if the STBusy scenario rather than the MatSetWay scenario occurs in the processing of the target request, the following three events may occur.

The first event is that eviction of the same set and the same way is initiated by the same cluster. It is noted that if the query result satisfies the STBusy scenario, it means that record eviction in the same set and the same way with respect to this cluster has occurred, so the snoop table module STM does not need to compare other tags.

The second event is that the snoop table module STM detects that the update information of the same set and the same way has been declared with a valid value and has been updated to the snoop table. This event means that there are other requests earlier than the target request, and these other requests will invalidate the BusyTag. Therefore, if the second event occurs, and the BusyTag is not evicted before the event, then it is likely that eviction of this BusyTag may not occur. At this time, the snoop table module STM may update the update information of the target request to the snoop table.

The third event is that if the request to invalidate the BusyTag is initiated after the target request, the second event will not occur before the target request is updated to snoop table. It can be confirmed that eviction of this BusyTag will not occur after this event, and then the snoop table may be updated according to this target request.

Figure 6:
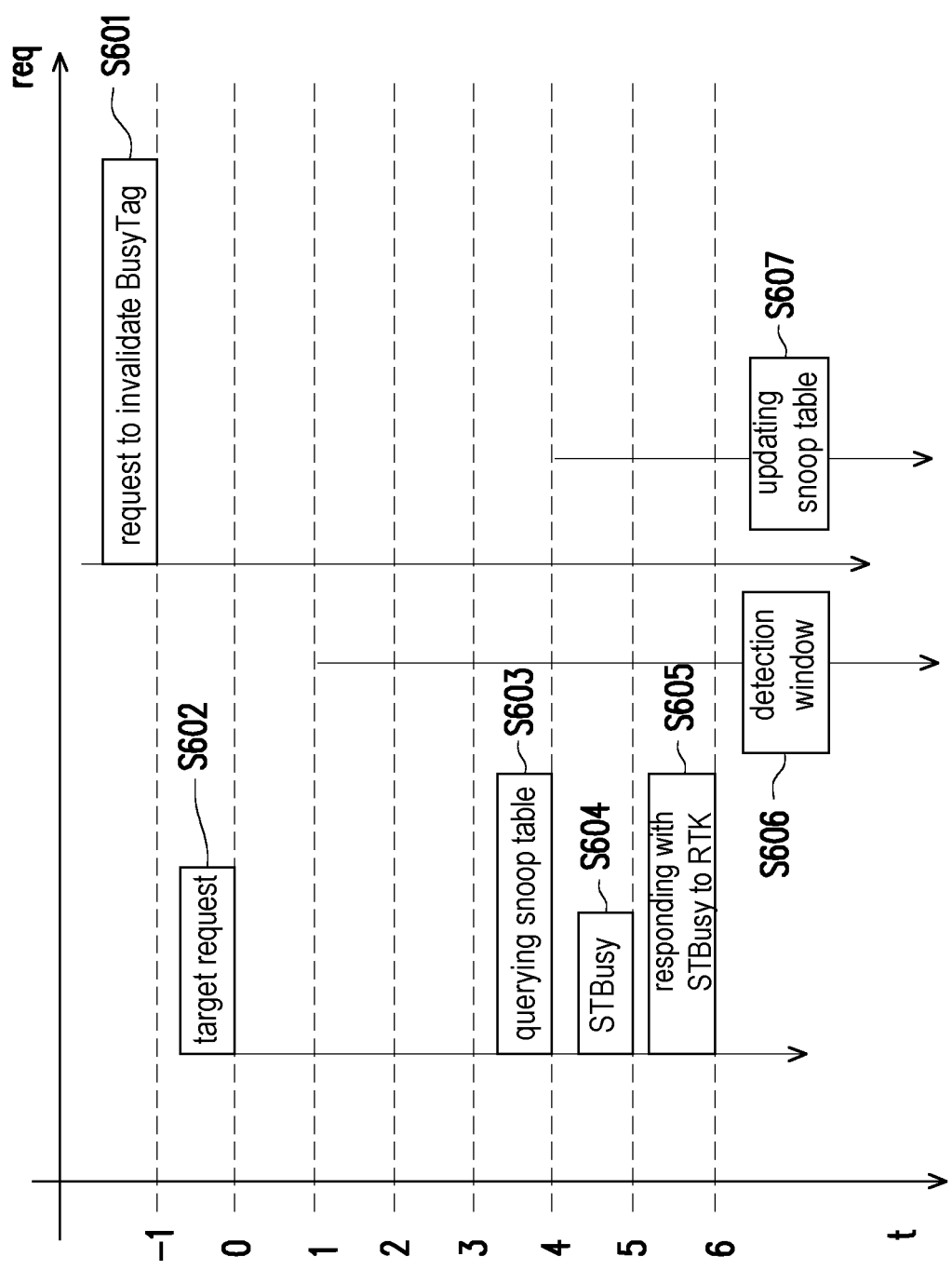
FIG. 6 is a timing diagram of a processing process according to an embodiment of the disclosure.

FIG. 6 is a timing diagram of a processing process according to an embodiment of the disclosure. Referring to FIG. 6, after the request to invalidate the BusyTag is initiated (step S601), the target request is then initiated (step S602). After four time units, the read tracker RTK queries the snoop table (step S603). In a detection window (step S606), the snoop table module STM finds that the query result satisfies the STBusy scenario (step S604) and responds with the STBusy scenario to the read tracker RTK (step S605). After the updates of other requests are completed (step S607), the snoop table module STM then updates the update information of the target request to the snoop table.

Figure 7:
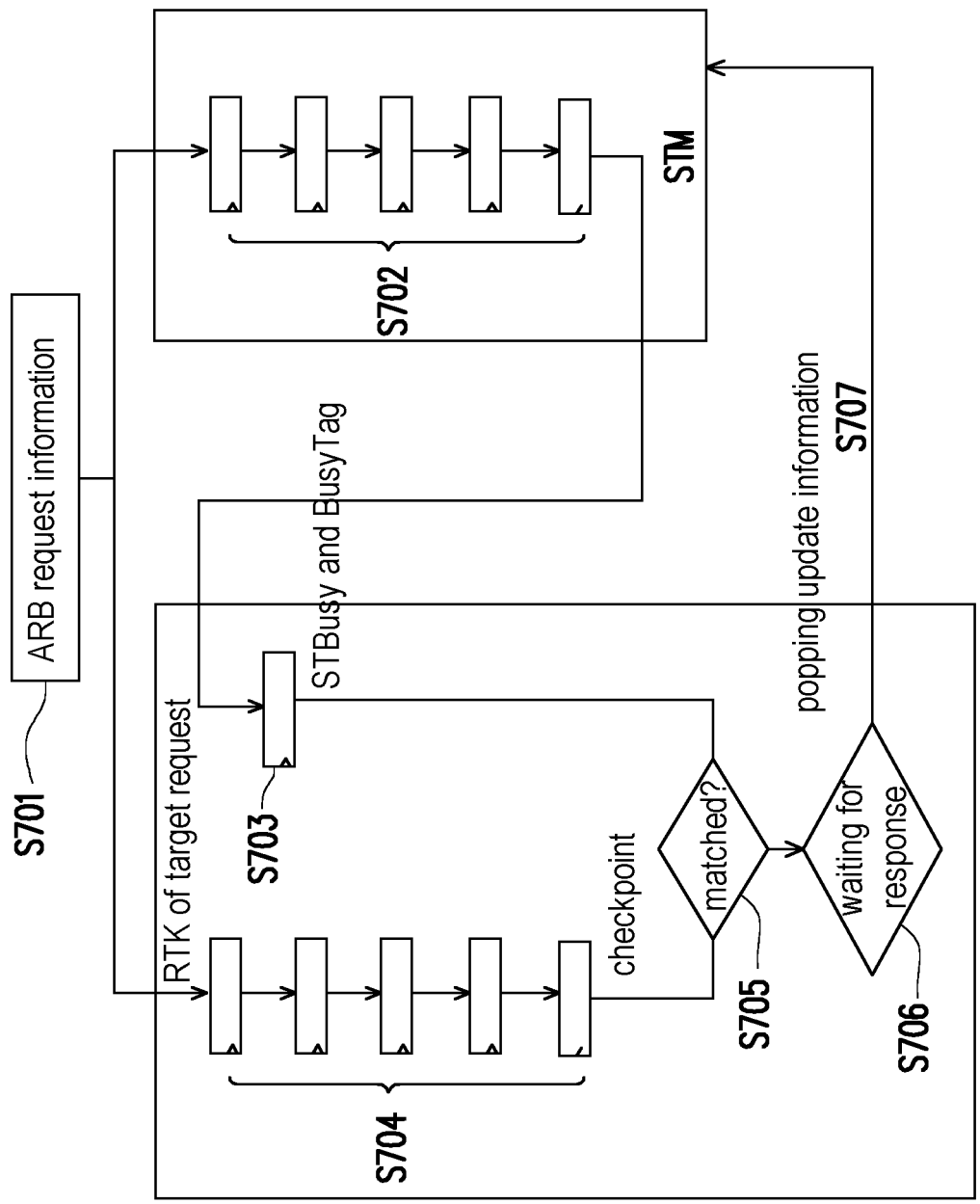
FIG. 7 is a flowchart of processing of a memory read request according to an embodiment of the disclosure.

FIG. 7 is a flowchart of processing of a memory read request according to an embodiment of the disclosure. Referring to FIG. 7, FIG. 7 shows an applied situation of the third event. The snoop table module STM extracts a carried attribute from a memory access request (step S701). The snoop table module STM queries the snoop table (step S702) and responds with the STBusy scenario and the BusyTag (step S703). At a checkpoint after a delay of five time units (step S704), the read tracker RTK of the target request determines whether the corresponding tag, set, and way of the target request match, and whether it matches in the following Table (3) (step S705), wherein the way corresponds to the column in the snoop module, and the set corresponds to the row.

TABLE (3)

| No. | Read/write | From same cluster | Cacheable | Share-OK | Match |
|---|---|---|---|---|---|
| 1 | 1 | 1 | 1 | x | 0 |
| 2 | 1 | 1 | 0 | x | 1 |
| 3 | 1 | 0 | x | 1 | 0 |
| 4 | 1 | 0 | x | 0 | 1 |
| 5 | 0 | x | 0 | 0 | 1 |

Specifically, "read/write" being "0" means writing, and "1" means reading. "From same cluster" being "0" means different clusters, and "1" means the same cluster. "Cacheable" being "0" means non-cacheable, and "1" means cacheable. "Share-OK" being "0" means non-share-OK, and "1" means share-OK. "Match" being "0" means not matched, "1" means matched, and "x" means not considered. In other words, if the target memory read request and the request corresponding to the BusyTag come from the same cluster, and the request corresponding to the BusyTag records "non-cacheable", then it matches (satisfying the STBusy scenario). If the target memory read request and the request corresponding to the BusyTag come from different clusters, and the request corresponding to the BusyTag records "non-shared-OK", then it matches. If the request corresponding to the BusyTag records "non-cacheable" and "non-shared-OK", it matches. Under the other conditions, it does not match. If the determination result is a match, the read tracker RTK of the target request waits for the snoop response (step S706) and then pops the update information to the snoop table (step S707).

On the other hand, when faced with the MatSetWay scenario, even if the STBusy scenario occurs at the same time, the snoop table module STM will still wait for the eviction of other requests on the fly before processing the update of the target request. Two events that allow the update operation to continue will be described below.

The fourth event is that eviction of the MSWHitTag is detected. After the target request is initiated, the read tracker RTK will detect whether eviction of the same set and the same way has a tag matching the MSWHitTag. An expected eviction will occur after the data is read back. At this time, the target request has not yet read back the data or has just read back the data.

Figure 8:
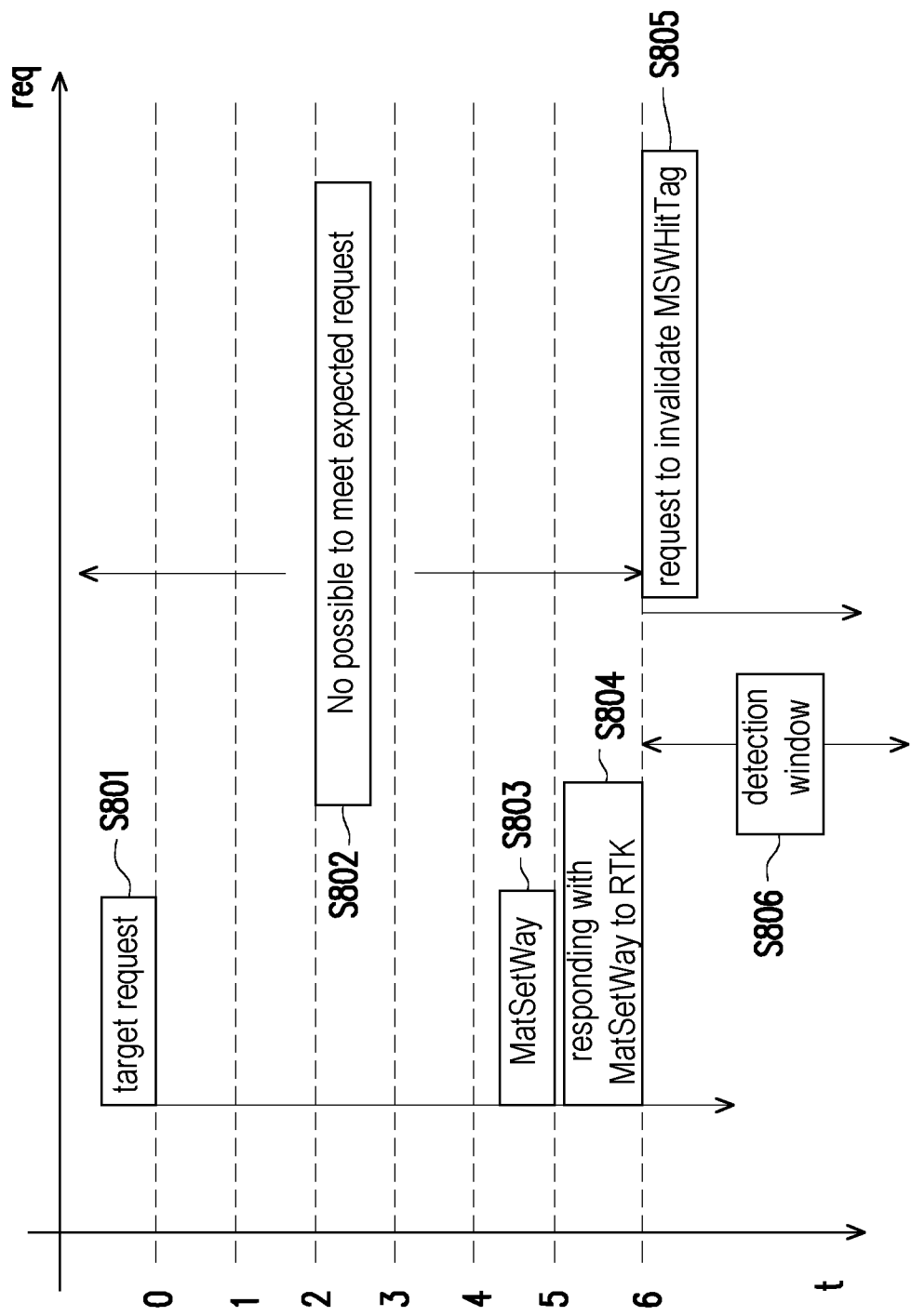
FIG. 8 is a timing diagram of a processing process according to an embodiment of the disclosure.

The fifth event is that, when parsing the attribute of the request, it is detected that the MSWHitTag is to be invalidated, which will result in cancellation of the above expected eviction. Similar to the third event, the snoop table module STM detects that a request is to invalidate the MSWHitTag and waits for the corresponding snoop response. For example, FIG. 8 is a timing diagram of a processing process according to an embodiment of the disclosure. After the target request is initiated (step S801), the snoop table module STM determines that the MatSet-Way scenario occurs (step S803) and responds with the MatSetWay scenario and the MSWHitTag to the read tracker RTK of the target request (step S804). In the above time period, the expected request (having the same tag as the MSWHitTag, having the same set as the target request, and satisfying the match in Table (3)) is not met (step S802). In the next detection window (step S806), the expected request to invalidate the MSWHitTag will occur (step S805).

Figure 9:
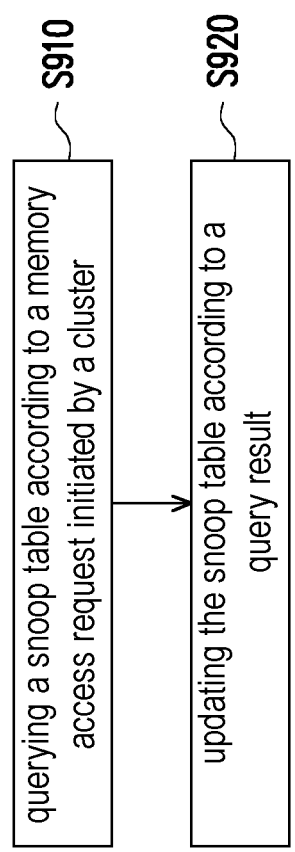
FIG. 9 is a flowchart of a cache processing method according to an embodiment of the disclosure.

Referring to FIG. 9, FIG. 9 is a flowchart of a cache processing method according to an embodiment of the disclosure. First, in step S910, a snoop table (as shown in FIG. 2, corresponding to the storage structure of all local caches) in a shared cache SC may be queried according to a memory access request initiated by a cluster. In step S920, the snoop table may be updated according to a query result.

Reference may be made to the description in the above embodiments for details of the above steps, which shall not be repeatedly described herein.

In summary of the above, in the multi-chip system and the cache processing method provided in the embodiments of the disclosure, each chip is provided with a snoop table that records the corresponding local caches of all the local clusters and remote clusters. The storage structure of the snoop table is consistent with the storage structure of the local cache of all the clusters, and the content cached in the snoop table also changes as the content of the local cache changes. Accordingly, it is only necessary to snoop the cached content of the snoop table, and it is not necessary to reversely interfere with the local cache. In addition, in response to the end of the snooping, the update information will be generated according to the content of the memory access request, and the update information needs to be written to the snoop table, so that the snoop table can be consistent with the content of the local cache. On the other hand, to allow the ordering of the update information to operate normally, the embodiment of the disclosure provides the determination on the MatSetWay and STBusy scenarios. When the two scenarios are satisfied, the content of the target request is updated to the snoop table only after the update of the previous request is completed.

Lastly, it shall be noted that the foregoing embodiments are meant to illustrate, rather than limit, the technical solutions of the disclosure. Although the disclosure has been detailed with reference to the foregoing embodiments, persons ordinarily skilled in the art shall be aware that they may still make modifications to the technical solutions recited in the foregoing embodiments or make equivalent replacements of part or all of the technical features therein, and these modifications or replacements do not cause the nature of the corresponding technical solutions to depart from the scope of the technical solutions of the embodiments of the disclosure.

What is claimed is:

1. A multi-chip system comprising:
   a plurality of chips, wherein each of the chips comprises:
      a plurality of clusters, wherein the plurality of clusters correspond to a plurality of local caches;
      a crossbar interface, coupled to the plurality of clusters, and coupled to a crossbar interface of another of the chips; and
      a snoop system, coupled to the crossbar interface, wherein within each of the chips, only one transmission direction from the crossbar interface toward the snoop system is implemented for communication between the crossbar interface and the snoop system, the snoop system comprising:
         a snoop table module, comprising a shared cache, wherein the shared cache records a snoop table; and
         a plurality of trackers, coupled to the snoop table module, querying the snoop table in the shared cache according to a memory access request initiated by one of the plurality of clusters, and updating the snoop table according to a query result.

2. The multi-chip system according to claim 1, wherein the snoop table corresponds to a storage structure of the plurality of local caches corresponding to the plurality of clusters in all of the plurality of chips.

3. The multi-chip system according to claim 1, wherein each of the plurality of trackers determines to snoop a first one of the plurality of clusters according to the query result, and issues update information to the snoop table module according to the query result to update the snoop table.

4. The multi-chip system according to claim 3, wherein the plurality of trackers issue a snoop request to the snoop table module to snoop a content recorded in a corresponding cache line corresponding to the first one in the snoop table, and issues the update information to update the snoop table according to reception of a snoop response corresponding to the snoop request.

5. The multi-chip system according to claim 1, wherein the plurality of trackers comprise a plurality of read trackers, the memory access request comprises a memory read request, and each of the plurality of read trackers obtains a corresponding content recorded in the snoop table according to the memory read request.

6. The multi-chip system according to claim 5, wherein when an update of the snoop table is completed, one of the plurality of read trackers pops a data requested by the memory read request to the corresponding cluster.

7. The multi-chip system according to claim 1, wherein one of the plurality of trackers comprises a plurality of write trackers, the memory access request comprises a memory write request and an output request, and each of the plurality of write trackers writes to a corresponding entry recorded in a corresponding local cache in the snoop table according to the memory write request or the output request.

8. The multi-chip system according to claim 7, wherein when an update of the snoop table is completed, one of the plurality of write trackers issues the memory write request to a memory.

9. The multi-chip system according to claim 3, wherein the snoop table module comprises a snoop table queue used to sequentially cache the update information according to a time sequence of the memory access request initiated by the cluster, and the snoop table module sequentially processes the update information.

10. The multi-chip system according to claim 3, wherein the update information comprises a valid value, and the valid value is used to indicate whether to update the snoop table.

11. The multi-chip system according to claim 10, wherein with respect to the memory access request being a memory read request,
when one of the plurality of clusters updated in the snoop table corresponds to the cluster that initiates the memory read request, and the memory access request records cacheable and has no value in a corresponding entry in the snoop table, then the valid value is associated with updating the snoop table,
when one of the plurality of clusters updated in the snoop table corresponds to the cluster that initiates the memory read request, and the memory access request records non-cacheable and has a value in the corresponding entry in the snoop table, then the valid value is associated with updating the snoop table, and
when one of the plurality of clusters updated in the snoop table does not correspond to the cluster that initiates the memory read request, and the corresponding entry in the snoop table has a value, then the valid value is associated with updating the snoop table.

12. The multi-chip system according to claim 10, wherein when the memory access request is a memory write request and has a value in a corresponding entry in the snoop table, then the valid value indicates updating the snoop table.

13. The multi-chip system according to claim 3, wherein the update information comprises a state value, and the state value is associated with whether a corresponding entry in the snoop table is valid, wherein
with respect to the memory access request being a memory read request, when one of the plurality of clusters updated in the snoop table corresponds to the cluster that initiates the memory read request, and the memory read request records cacheable, then the state value is associated with the corresponding entry in the snoop table being valid, and
with respect to the memory access request being a memory write request, the state value is associated with the corresponding entry in the snoop table being invalid.

14. The multi-chip system according to claim 3, wherein the update information comprises a second query, and the second query is associated with whether to perform a second query on the snoop table, wherein
with respect to the memory access request being a memory read request, when one of the plurality of clusters updated in the snoop table corresponds to the cluster that initiates the memory read request, and a corresponding entry in the snoop table has a value, then the second query is associated with performing the second query on the snoop table,
with respect to the memory access request being the memory read request, when one of the plurality of clusters updated in the snoop table does not correspond to the cluster that initiates the memory read request, and the memory access request records share-OK and has a value in the corresponding entry in the snoop table, then the second query is associated with performing the second query on the snoop table, and
with respect to the memory access request being a memory write request, when the corresponding entry in the snoop table has a value, then the second query is associated with performing the second query on the snoop table.

15. The multi-chip system according to claim 3, wherein with respect to the memory access request being a memory read request, the update information comprises at least one piece of first update information and second update information, and the at least one piece of first update information is issued earlier than the second update information and records cacheable, wherein when the snoop table module determines that the second update information records cacheable, the second update information corresponds to the same cluster as the at least one piece of first update information, and the second update information corresponds to a same entry and way as the at least one piece of first update information, then in response to completion of the at least one piece of first update information for the snoop table, the snoop table module processes the second update information.

16. The multi-chip system according to claim 15, wherein the snoop table module obtains a memory physical address recorded in a corresponding entry of an earliest one among the at least one piece of first update information, and in response to completion of eviction corresponding to the memory physical address recorded in the earliest one, the snoop table module confirms completion of an update of the at least one piece of first update information for the snoop table.

17. The multi-chip system according to claim 3, wherein with respect to the memory access request being a memory read request, the update information comprises third update information and fourth update information, and the third update information is issued earlier than the fourth update information and records cacheable, wherein when the snoop table module determines that the fourth update information records cacheable, the fourth update information corresponds to the same cluster as the third update information, and the fourth update information and the third update information correspond to different memory physical addresses, then in response to completion of an update of the third update information for the snoop table, the snoop table module processes the fourth update information.

18. A cache processing method comprising:
providing a plurality of chips, wherein each of the chips comprises a plurality of clusters, and each of the plurality of clusters corresponds to a local cache;
providing a shared cache shared by the plurality of clusters included in each of the plurality of chips, wherein the shared cache records a snoop table;
querying the snoop table in the shared cache according to a memory access request initiated by one of the plurality of clusters; and
updating the snoop table according to a query result,
wherein each of the chips further comprises a snoop system and a crossbar interface coupled to the plurality of clusters,
wherein within each of the chips, only one transmission direction from the crossbar interface toward the snoop system is implemented for communication between the crossbar interface and the snoop system.

19. The cache processing method according to claim 18, wherein the snoop table corresponds to a storage structure of the local cache corresponding to the plurality of clusters in all of the plurality of chips.

20. The cache processing method according to claim 18, wherein the step of updating the snoop table according to the query result comprises:
determining to snoop a first one of the plurality of clusters according to the query result; and
issuing update information in response to reception of the query result to update the snoop table.

21. The cache processing method according to claim 20, wherein the step of issuing the update information in response to reception of the query result to update the snoop table comprises:
issuing a snoop request to snoop a content recorded in a corresponding cache line corresponding to the first one in the snoop table; and
issuing the update information in response to reception of a snoop response corresponding to the snoop request to update the snoop table.

22. The cache processing method according to claim 18, wherein the memory access request comprises a memory read request, and the step of querying the snoop table in the shared cache according to the memory access request initiated by the one of the plurality of clusters comprises:
obtaining a corresponding content recorded in the snoop table according to the memory read request.

23. The cache processing method according to claim 22, wherein after the step of updating the snoop table according to the query result, the method further comprises:
in response to completion of an update of the snoop table, popping a data requested by the memory read request to the corresponding cluster.

24. The cache processing method according to claim 18, wherein the memory access request comprises a memory write request and an eviction request, and the step of querying the snoop table in the shared cache according to the memory access request initiated by the one of the plurality of clusters comprises:
writing to a corresponding entry recorded in a corresponding local cache in the snoop table according to the memory write request or the eviction request.

25. The cache processing method according to claim 24, wherein after the step of updating the snoop table according to the query result, the method further comprises:
in response to completion of an update of the snoop table, issuing the memory write request to a memory.

26. The cache processing method according to claim 20, further comprising:
sequentially caching the update information according to a time sequence in which the cluster initiates the memory access request; and
sequentially processing the update information.

27. The cache processing method according to claim 20, wherein the update information comprises a valid value, and the valid value is associated with whether to update the snoop table.

28. The cache processing method according to claim 27, wherein in the step of updating the snoop table according to the query result:
with respect to the memory access request being a memory read request,
when one of the plurality of clusters to be updated in the snoop table corresponds to the cluster that initiates the memory read request, and the memory access request records cacheable and has no value in a corresponding entry in the snoop table, then the valid value is associated with updating the snoop table,
when one of the plurality of clusters to be updated in the snoop table corresponds to the cluster that initiates the memory read request, and the memory access request records non-cacheable and has a value in the corresponding entry in the snoop table, then the valid value is associated with updating the snoop table, and
when one of the plurality of clusters to be updated in the snoop table does not correspond to the cluster that initiates the memory read request, and the corresponding entry in the snoop table has a value, then the valid value is associated with updating the snoop table.

29. The cache processing method according to claim 27, wherein in the step of updating the snoop table according to the query result:
with respect to the memory access request being a memory write request, when a corresponding entry in the snoop table has a value, then the valid value is associated with updating the snoop table.

30. The cache processing method according to claim 20, wherein the update information comprises a state value, and the state value is associated with whether a corresponding entry in the snoop table is valid, wherein in the step of updating the snoop table according to the query result:
with respect to the memory access request being a memory read request, when one of the plurality of clusters to be updated in the snoop table corresponds to the cluster that initiates the memory read request, and the memory read request records cacheable, then the state value is associated with the corresponding entry in the snoop table being valid, and with respect to the memory access request being a memory write request, the state value is associated with the corresponding entry in the snoop table being invalid.

31. The cache processing method according to claim 20, wherein the update information comprises a second query, and the second query is associated with whether to perform a second query on the snoop table, wherein in the step of updating the snoop table according to the query result:

with respect to the memory access request being a memory read request, when one of the plurality of clusters updated in the snoop table corresponds to the cluster that initiates the memory read request, and a corresponding entry in the snoop table has a value, then the second query is associated with performing the second query on the snoop table, with respect to the memory access request being the memory read request, when one of the plurality of clusters updated in the snoop table does not correspond to the cluster that initiates the memory read request, and the memory access request records share-OK and has a value in the corresponding entry in the snoop table, then the second query is associated with performing the second query on the snoop table, and with respect to the memory access request being a memory write request, when the corresponding entry in the snoop table has a value, then the second query is associated with performing the second query on the snoop table.

32. The cache processing method according to claim 20, wherein with respect to the memory access request being a memory read request, the update information comprises at least one piece of first update information and second update information, and the at least one piece of first update information is issued earlier than the second update information and records cacheable, wherein the step of updating the snoop table according to the query result comprises:

when it is determined that the second update information records cacheable, the second update information corresponds to the same cluster as the at least one piece of first update information, and the second update information corresponds to a same entry and way as the at least one piece of first update information, then in response to completion of the at least one piece of first update information for the snoop table, processing the second update information.

33. The cache processing method according to claim 32, wherein before the step of responding to completion of the at least one piece of first update information for the snoop table, the method further comprises:

obtaining a memory physical address recorded in a corresponding entry of an earliest one among the at least one piece of first update information; and in response to completion of eviction corresponding to the memory physical address recorded in the earliest one, confirming completion of an update of the at least one piece of first update information for the snoop table.

34. The cache processing method according to claim 20, wherein with respect to the memory access request being a memory read request, the update information comprises third update information and fourth update information, and the third update information is issued earlier than the fourth update information and records cacheable, wherein the step of updating the snoop table according to the query result comprises:

when it is determined that the fourth update information records cacheable, the fourth update information corresponds to the same cluster as the third update information, and the fourth update information and the third update information correspond to different memory physical addresses, then in response to completion of an update of the third update information for the snoop table, processing the fourth update information.

* * * * *